United States Patent [19]

Ammon

[11] 4,125,935

[45] Nov. 21, 1978

[54] METHOD FOR ASSEMBLY OF ELECTRICAL CONNECTOR

[75] Inventor: J. Preston Ammon, Dallas, Tex.

[73] Assignee: Elfab Corporation, Dallas, Tex.

[21] Appl. No.: 805,786

[22] Filed: Jun. 13, 1977

Related U.S. Application Data

[62] Division of Ser. No. 667,963, Mar. 18, 1976, Pat. No. 4,050,769.

[51] Int. Cl.$^2$ .............................................. H02G 15/00

[52] U.S. Cl. .......................................... 29/629; 29/739

[58] Field of Search ......................... 29/629, 418, 739; 339/210 M, 206 R, 176 MP, 17, 64, 198

[56] References Cited

U.S. PATENT DOCUMENTS

| | | | |
|---|---|---|---|
| 3,525,972 | 8/1970 | Asick et al. | 339/206 R X |
| 3,530,422 | 9/1970 | Goodman | 339/176 MP |
| 3,601,762 | 8/1971 | Eshelman | 339/210 M |
| 3,668,604 | 6/1972 | Rossman | 339/210 M |
| 3,769,679 | 11/1973 | Kendall | 29/739 X |
| 3,783,438 | 1/1974 | Grant | 339/210 R |

*Primary Examiner*—Leon Gilden
*Attorney, Agent, or Firm*—Crisman & Moore

[57] ABSTRACT

Electrical contacts are stamped and formed into a right angle configuration for simultaneous insertion and housing in an effectively removable connector insulator. Linear receiving sleeves may be formed in each of two sections so the insulator, which sleeves meet at right angles, one to the other, when the insulator is assembled. Each linear sleeve is constructed to permit one of the linear portions of the contact to be inserted therein. The assembled insulator serves as a holding fixture and seating tool for transmitting forces applied to the top of the insulator to each one of the contacts for inserting an extended portion thereof into a contact receiving aperture in a mounting substrate for rigid mounting therein, with the orthogonal portion of the contact lying generally parallel to the substrate. The contact of the assembled connector is then in a configuration for electrical engagement with a mating contact aligned generally parallel to the mounting substrate rather than perpendicular thereto.

The configuration of the assembled connector permits removal of one of the sections of the insulator by separating and sliding it away from the other insulator section and from around the orthogonal portion of the contacts which it houses, leaving the contacts partially housed and rigidly mounted in the substrate through press fitting and/or wave soldering. The exposed contacts may then be removed and replaced as is necessary for repair. Further, a connector assembly, comprising only an insulator having right angle contacts held therein, may be readily shipped to a remote location for installation in a mounting substrate.

4 Claims, 15 Drawing Figures

METHOD FOR ASSEMBLY OF ELECTRICAL CONNECTOR

This is a division of application Ser. No. 667,963, filed Mar. 18, 1976 now U.S. Pat. No. 4,050,769.

BACKGROUND OF THE INVENTION

The invention relates to an electrical connector, and more particularly, to an electrical connector having contacts formed in right angle configurations securely held within sleeves formed in an effectively removable insulator adapted to serve as a holding fixture and seating tool for inserting perpendicular portions of the contacts into receiving apertures formed in a mounting substrate while second orthogonal portions of the contacts lie generally parallel thereto.

In the past, connector applications have included straight post type contacts secured in the mounting substrate, in a perpendicular relationship thereto. Such contacts generally include upper interconnection mating portions for coupled engagement with electrical connectors and/or conductors, as in the form of electrical component leads or edges of printed circuit boards. In such straight post contact applications, the axis of the mating interconnection is, by definition, perpendicular to the plane of the mounting substrate. From an electrical packaging standpoint, such directional orientation of mating elements is generally desirable for electrical components, card edge connectors and backpanel assemblies, and/or related applications where the mating conductors may be at right angles to the mounting substrate without extending beyond the alloted space limitations above the substrate.

Certain other connector applications require that the contacts comprising one of the electrical connectors of a matingly connected pair be provided in such a configuration as to engage the second mating connector along an axis generally parallel to the mounting substrate of the first connector, providing an orthogonal, or right angle, interconnection of the substrates. In certain prior art connectors of such a type, the contacts are constructed in a right angle configuration. A first straight portion is provided for the securing thereof to the mounting substrate while the second, orthogonal portion lies at a right angle to the first and parallel to the mounting substrate. In this manner the plane of the mounting substrate and the axis of the mating interconnection with a second connector are generally parallel and provide for numerous packaging design advantages. However, the practical approaches to assembling and securing such right angle contacts to the mounting substrate have been limited due to the orthogonal configuration of the contact, and assembly problems associated therewith. Generally, only discrete connectors, having the contacts molded therein, have been effectively utilized for such applications.

For certain connector applications, it is specifically desirable to press fit the contacts directly into the mounting substrate rather than soldering them, as is often the procedure with discrete connectors. When the contacts of either straight post or right angle construction, are press fitted, the mounting substrate may singularly support the contacts and hold them rigidly in a fixed configuration. Such a press fit approach is in contrast to that of the discrete connector where the contact is permanently mounted and supported within an insulative body. Although an insulative body may be used in both instances, in the latter, discrete connector, the insulator is the primary structural support for the contacts, and problems arise because the insulator can not be removed after the connector is mounted to the substrate. In that instance, it is virtually impossible to remove individual ones of the contacts from within the molded insulator and/or mounting substrate for repair in the event one of the contacts, whether straight or right angle in configuration, is damaged.

Certain prior art approaches to press fitted contacts have heretofore primarily included only the straight post type contacts having rigid, transversely extending load bearing shoulders for receiving and rigidly withstanding the requisite press fit insertion force from an insertion tool. Moreover, certain straight post contacts have been constructed for being press fitted into apertures in a mounting substrate and subsequently covered by a layover insulator to provide a multitude of advantages. One such contact, of the card edge connector type, is described in U.S. Pat. No. 3,671,917 issued to John P. Ammon and Frederick T. Inacker on June 20, 1972 and assigned to the assignee of the present invention. The contact set forth therein is characterized by a load bearing shoulder for engaging a press fit tool immediately above the region of the contact adapted for interfering engagement with the contact receiving aperture in the mounting substrate. The area of the contact between the press fit shoulder and the area of engagement of the contact receiving aperture is sufficiently rigid so that the contact will not buckle or bend under the longitudinal force required for press fitting. Once the contacts are press fitted into apertures in the mounting substrate, such as conventional printed circuit board backpanels, the insulative housing is snapped over the top thereof.

Related prior art approaches to press fit contacts have also included the utilization of the insulative housing as the contact holding fixture, and in some cases, as the seating tool for press fitting the contact. One such approach is illustrated in U.S. Pat. No. 3,530,442 to David S. Goodman entitled "Connector and Method for Attaching Same to Printed Circuit Board". The connector described in the Goodman patent, includes straight post type contacts which are top loaded down into slots in the insulator. The contact tails are pulled through to seat the contacts and the lower portion of each contact is twisted 90 degrees to lock each contact into the insulator bottom and to provide an abutting engagement between the insulator bottom and relatively large outwardly extending shoulders formed on the contact. The contacts can then be press fitted into apertures in a substrate by applying force to the top of the insulator. However, once the contacts have been fully press fitted, it is impossible to remove the insulator to expose individual ones of the contacts for repair, as is the case with discrete connectors as a whole.

A trend in the development of the substrate mounted connector art is that of using structures which include an insulator removable from around the contacts rigidly mounted into a substrate. A principal reason for removable layover-insulators, as stated above, is repairability. An insulator which may be removed from around the press fitted contacts provides a means of access to those contacts and facilitates repairability. The same is true whether the contacts are of the straight post type or right angle type. It is similarly desirable to provide connectors having insulators and contacts, straight post or right angle, wherein the insulator itself can serve as a contact holding fixture and a press fitting tool and then be subsequently removable after the contacts are rigidly press fitted into a substrate. One such connector, having straight post contacts, is disclosed and described in co-pending U.S. patent application, Ser. No. 597,751, filed by J. Preston Ammon on July 21, 1975, entitled "Electrical Connector and Method of Fabrication and Assembly", and assigned to the assignee of the present invention. Such a connector, having right angle contacts, is the subject of the present invention.

The connector and method of the present invention is especially adapted for the assembly and housing of right angle contacts in an effectively removable insulative housing. The term "effectively removable" is used as describing an insulative housing wherein the whole housing or a sufficient portion thereof may be removed to permit access to the contacts and their removal from the substrate. The present connector and method thus overcome many of the disadvantages of the prior art by providing an insulative housing for right angle contacts, which itself serves as the holding fixture and may serve as the press fit tool for the contacts, and yet is effectively removable therefrom after the contacts are rigidly installed in a substrate for repairability of the connector. In addition, the right angle contacts may be simultaneously inserted in each section of the insulator, and securely held in position in the assembled structure so as to facilitate normal handling as a complete subassembly akin to some of the features of discrete connectors.

SUMMARY OF THE INVENTION

The invention relates to a connector and a method of assembling an electrical connector which includes right angle contacts held within sleeves in an effectively removable insulator, and which insulator may be specially adapted for press fitting right angle contacts into receiving apertures in a mounting substrate. More particularly, the invention involves an electrical connector wherein a plurality of contacts are formed with interconnection mating portions perpendicular to their substrate mounting portions and which are simultaneously inserted into and seated within sleeves of an insulator. The insulator includes a first housing section having linear, transverse sleeves extending therethrough in a generally parallel relationship to the mounting substrate, and may include a second housing section having linear sleeves arranged for positioning in perpendicular registry with the ends of the transverse sleeves of the first housing when said first and second housings are assembled one to the other. A portion of each contact depends from a lower surface of the assembled insulator which portion may be adapted for press fitting into a receiving aperture in the substrate wherein the contact is rigidly held.

In another aspect, the invention includes an electrical connector comprising an insulative housing including first and second housing sections having linear sleeves in one housing section formed perpendicular to linear sleeves in the other housing section and in orthogonal registry therewith for serving as a holding fixture and seating tool for a plurality of right angle contacts simultaneously loaded into the sleeves. The sleeves of the second housing section are spaced for subsequent alignment with apertures in a mounting substrate. The right angle contacts are securely held within the insulative housing by the orthogonal configuration of the sleeves thereof, facilitating its assembly to the mounting substrate through press fitting, wave soldering, or the like. A transverse portion of each contact is provided in generally parallel relationship to the mounting substrate and is seated against an upper inside wall of the transverse sleeve of the first housing section providing a load bearing configuration for uniformly receiving and rigidly withstanding the forces transmitted through the first housing section to the right angle contacts for the insertion of the generally perpendicular portion thereof into the mounting substrate.

In still another aspect, the invention includes an interconnection system comprising a mounting substrate having an array of contact receiving apertures, an insulative housing having contact receiving sleeves arranged in registry with the aperture array, and a plurality of right angle contacts held within the sleeves. The contacts may be press fitted through the apertures by insertion forces transmitted through the insulator. Each contact may include an extended male contact portion for conductively engaging the tines of a female contact; a central orthogonal portion in mating engagement in a right angle sleeve formed in the two part insulator; and a depending press fit portion extending into the contact receiving apertures of the mounting substrate in interfering engagement therewith.

The electrical connector and interconnection system of the present invention further facilitate repairability in that once the right angle contacts have been housed in the insulative housing and secured in the substrate, a first section of the insulative housing may be removed from around the linear portion of the contacts lying parallel to the substrate by sliding it outwardly along said substrate and away from a second section of the insulative housing. Damaged contacts maya then be individually removed from the remaining section of the insulative housing and the mounting substrate for replacement without affecting the remainder of the system.

In still another aspect, the invention includes an electrical connector for orthogonal interconnection of planar substrates comprising an insulative housing of unitary construction having linear, transverse sleeves formed therethrough in spaced parallel relationship to the planar substrate mounted thereto, for serving as a seating tool and holding fixture for a plurality of right angle contacts. The right angle contacts are held within the insulative housing by light, frictional engagement between the transverse sleeves of the housing and first linear portions of the contacts received therein. The second, orthogonal portions of the right angle contacts extend downwardly from the housing and through contact receiving apertures in the mounting substrate in secured engagement therewith.

In yet another aspect, the invention includes a method of assembling an electrical connector for orthogonal interconnection of planar substrates including a first insulative housing having a plurality of linear, transverse contact receiving sleeves formed therethrough and press fit contact terminals formed in a right angle configuration, by the generally flush mounting of the insulator upon a mounting substrate. Linear, transverse portions of the contacts are inserted into the transverse sleeves of the insulative housing with the orthogonal contact portions depending therefrom. The orthogonal, depending portions of the contacts are generally vertically positioned relative to the substrate and are guided into aligned receiving apertures therein where press fitting may be accomplished by applying a downward force to the insulator and/or outwardly extending transverse portions of the contacts to effect movement of the insulator and the right angle contacts relative to the substrate. The contacts may also be simultaneously inserted into the sleeves of the first insulative housing when the contacts are connected to a common support strip.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION

Figure 1:
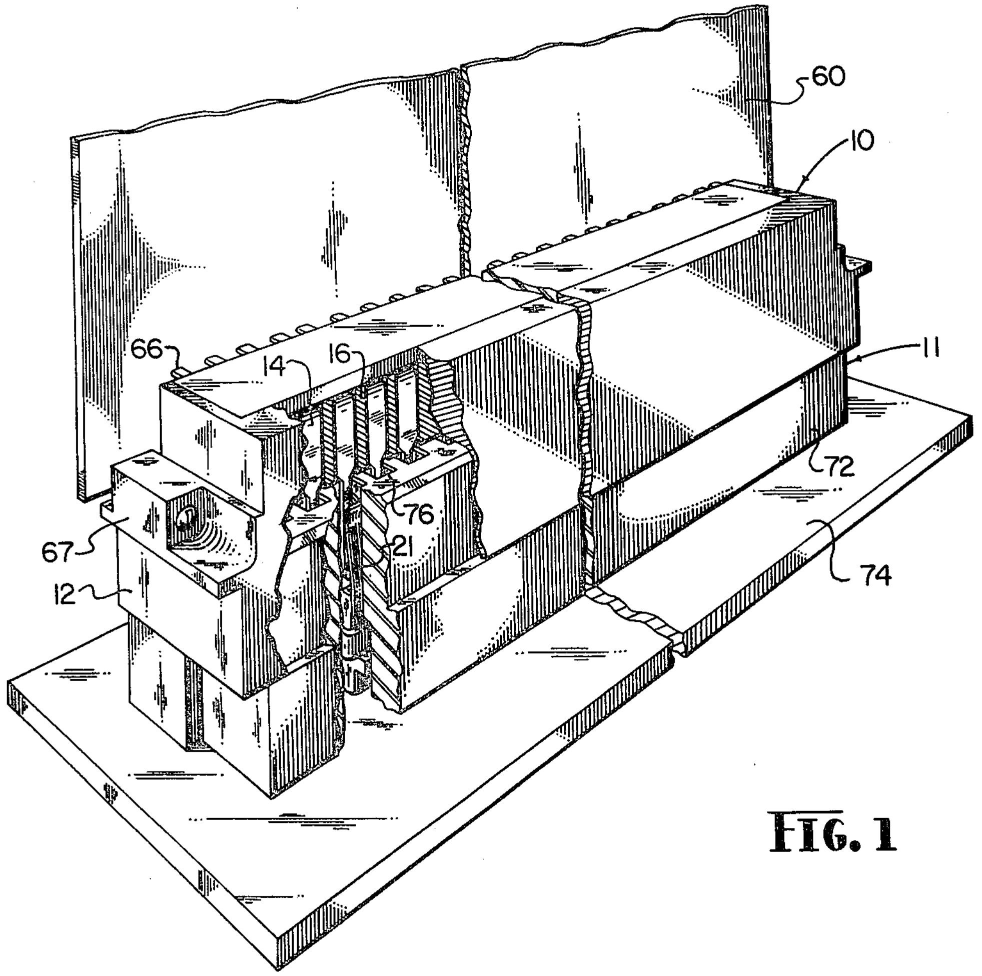
FIG. 1 is a fragmentary perspective view of an electrical connector constructed in accordance with the principles of the present invention and in interconnecting engagement with a mating connector, with a part of the insulative housing of each connector cut away to illustrate the mating interconnection relationship and the orthogonal configuration of the sleeves of the insulative housing of the present invention and the contacts seated therein.

Referring first to FIG. 1, there is shown a perspective view of one embodiment of an electrical connector 10 constructed in accordance with the principles of the present invention and, which connector 10 is shown in coupled engagement with a mating connector 11. The connector 10 as shown includes a plurality of male contacts 14 formed in right angle configurations and an insulator 12 of two part, or bipartite, construction, having a plurality of orthogonal contact receiving sleeves 16 formed therethrough. The right angle configuration of the contacts 14 of the connector 10 provides for the orthogonal interconnection, or mating engagement, of the two mounting substrates.

Figure 2:
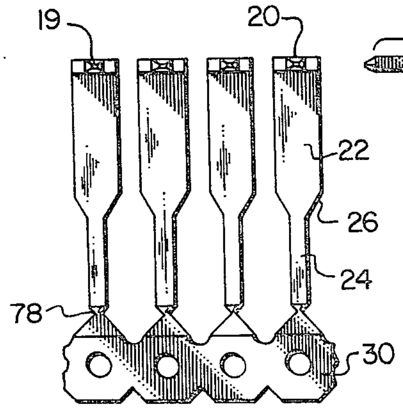
FIG. 2 is a front elevational view of the contacts shown in FIG. 1, attached to a common support strip prior to the assembly thereof in an insulative housing.
Figure 3:
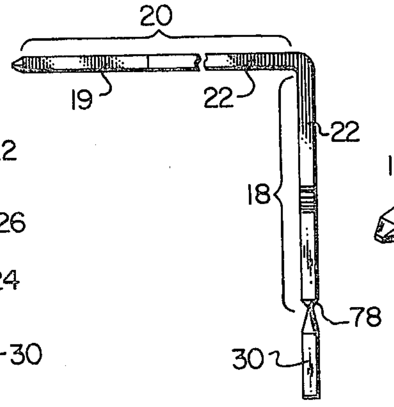
FIG. 3 is a side elevational fragmentary view of the contacts of FIG. 2 showing the orthogonal configuration thereof.
Figure 4:
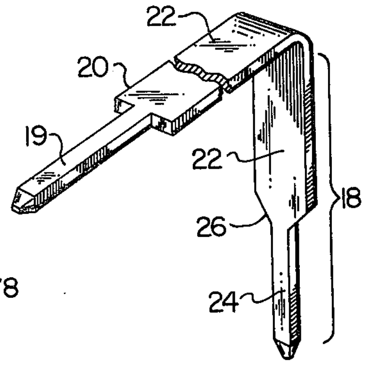
FIG. 4 is a perspective, fragmentary view of one of the right angle contacts of FIG. 1.

As shown most clearly in FIGS. 2 through 4, each contact 14 of this particular embodiment includes a solid, straight post lower portion 18 formed at a right angle to a straight post, upper portion 20. Upper portion 20 includes a single, outwardly extending mating portion, which may be of either the male or female variety, forming the mating end thereof. As shown in FIGS. 2 through 4 the mating portion may comprise a male, contactor region having a blade portion or tine 19 which is preferably plated for electrical interengagement with a female contact 21 of the type shown in the mating connector 11 of FIG. 1. Adjacent, and inwardly of the relatively narrow male portion 19 is a wider shank portion 22 which is foldably formed into the right angle configuration as shown, and which widened shank portion 22 extends perpendicular to itself through the upper region of the lower contact portion 18. A generally square depending section 24, of reduced width, extends downwardly from the shank portion 22 through a narrowing transition region 26 to form an optional wire-wrap tail. The area of the shank portion 22 immediately above the transition region 26 is adapted for mounting in contact receiving apertures in a substrate, and being securely held therein through soldering and/or interfering engagement as produced through press fitting.

As shown most clearly in FIG. 2, the contacts 14 are preferably formed through a stamping and folding operation while attached to a carrier strip 30. The term stamping is used in the conventional sense to mean a progressive die forming operation; while folding, as used herein, is the forming of a bend in a stamped sheet of generally pliant conductive material, by angularly displacing one planar surface with respect to an adjacent surface, forming a crease therebetween. In the contact 14 of the present invention, the bend is made along a line generally perpendicular to the longitudinal axis of the contact. The contacts 14 are preferably stamped from sheet metal having a thickness generally on the order of 20 to 25 mils. Purely by way of example, Extra Hard Phosphor Bronze has been found to work satisfactorily. The various areas and contour of the contacts of the invention are formed by the progressive stamping and folding operations.

The right angle contacts 14, constructed in accordance with the principles of the present invention, are sized and shaped for being received and seated within a removable sub-assembly structure such as the bipartite, insulative housing of FIG. 1. Referring again to FIG. 1, the insulator 12 is formed from a block of dielectrical material such as plastic and is adapted for housing the contacts 14 in the orthogonal contact receiving sleeves 16 formed therethrough. Each sleeve 16 includes a right angle passage following the configuration of the contact shank portion 22, and preferably having straight, smooth side walls of generally uniform, rectangular cross-section.

Figure 5:
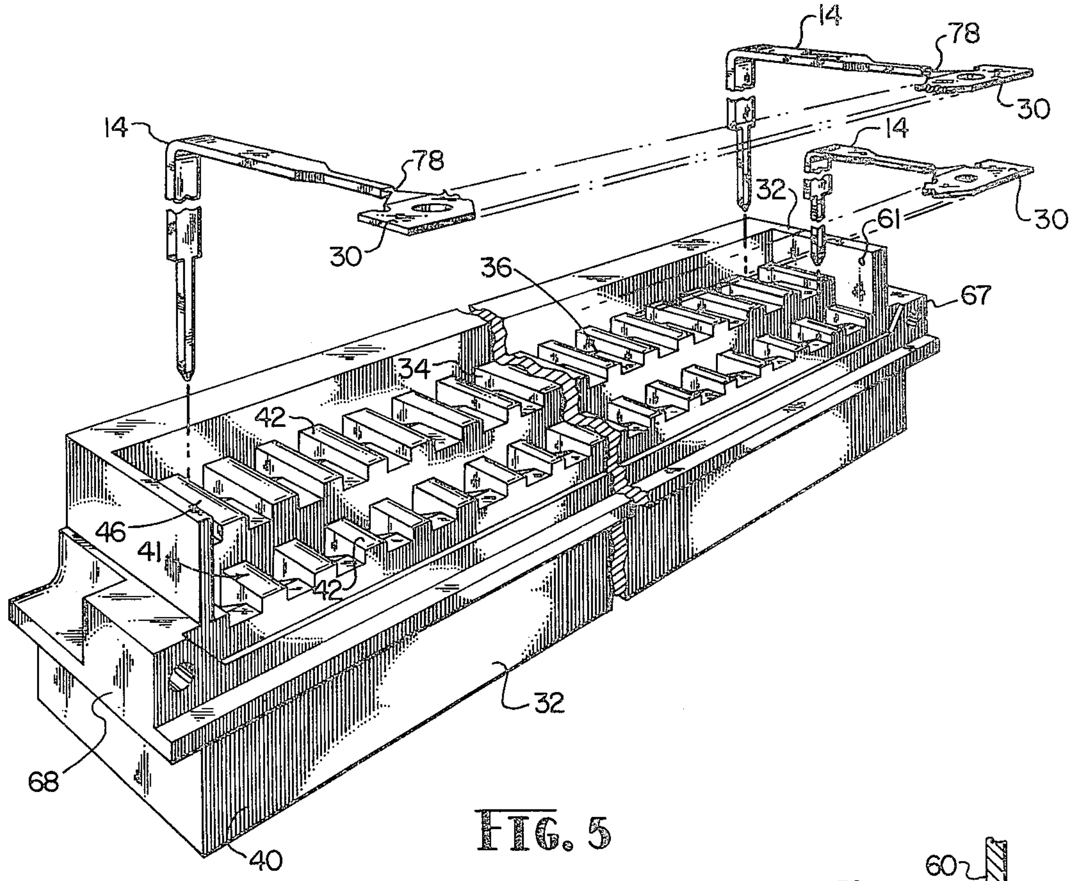
FIG. 5 is a fragmentary, exploded, perspective view of one section of the electrical connector of the present invention shown in FIG. 1, illustrating a row of fabricated contacts attached to a common support strip and being loaded into sleeves formed in one section of the insulator.
Figure 6:
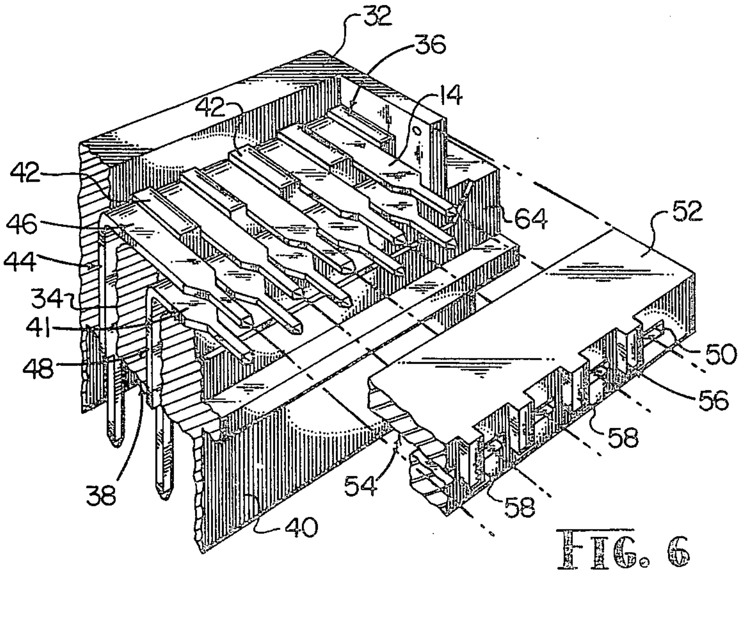
FIG. 6 is a fragmentary, exploded, perspective view of the complete contact and insulator sub-assembly of FIG. 5, with a second section of the insulator being assembled thereto.

Referring now to FIGS. 5 and 6, it is seen that the insulator 12 of the particular bipartite embodiment illustrated includes two separable sections adapted for mating engagement and releasable coupling one to the other. It will be shown below that the two-part structure, although preferable in many applications, can be replaced with an insulator of unitary construction. Whether unitary or bipartite in construction, a first insulator section, hereinafter referred to as the casing 32 adapted for housing the upper portion 20 of the contacts 14 will generally always be provided. Casing 32 includes a plurality of linear passages 34, transversely positioned in parallel spaced relationship. In the bipartite insulator of FIGS. 5 and 6, the transverse passages 34 comprise one of the two orthogonal sections forming the complete insulator sleeves 16. Transverse passages 34 extend from an inside face of the casing 32 to an outside face 38, thereof, which outside face is provided with a skirt 40 extending substantially therearound. The inside face 36 is also comprised if a series of ribs 42 positioned between the inside end openings of the passages 34 to comprise partial extensions thereof for the positioning of the contacts 14 therein. The passages 34 are formed of a size and shape for receiving the contacts 14, and specifically the shank portions 22 thereof, in a mating, preferably slip-fit engagement. The passages 34 are also provided in a plurality of longitudinal rows along the length of the casing 32, which rows and the respective passage inside end openings are positioned in parallel spaced, bi-planar, or stair-stepped relationship, one to the other. In this manner a first, outer row 44 of passages 34 terminate across an upper row 46 of ribs 42; while a second, inner row 48 of passages 34 terminate across a lower row 41 of ribs 42 in vertical alignment therewith. The biplanar aspect of the termination of passages 34 provides for the positioning of the passages 34 of rows 44 and 48, one directly beneath the other, and similarly the contacts 14, one beneath the other, as shown in FIG. 6.

A second insulator section, hereinafter referred to as the plug 52, is adapted for housing the lower portion 18 of the contacts 14 in the bipartite insulator construction, wherein the contacts are securely held in a motionless, aligned configuration. Plug 52 includes a plurality of linear passages 50 provided in parallel spaced relationship with one another; which passages 50 form the second of the two orthogonal sections comprising the sleeves 16. Passages 50 extend from an inside face 54 of the plug 52 to a bottom face 56, thereof; which bottom face is adapted for mounting to the surface of the mounting substrate. The bottom face 56 is also comprised of a series of ribs 58 positioned between the bottom openings of the passages 50. The passages 50 are formed of a size and shape for receiving the contacts 14 therein, in a mating, preferably slip-fit engagement, in one or more longitudinal rows along the length of the plug 52. In the embodiment of the connector 10 as shown, only a single row of passages 50 is necessary to accommodate the two rows of contacts 14 provided in said connector, as will be discussed below.

Figure 7:
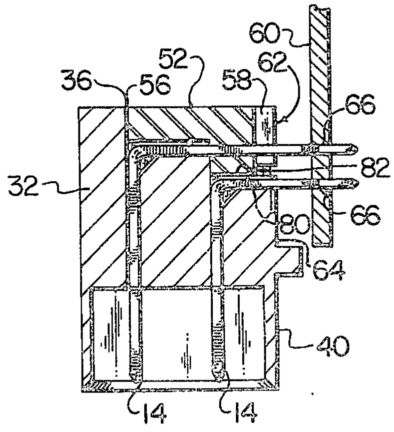
FIG. 7 is a side elevational, cross-sectional view of the assembled connector sub-assembly of FIG. 6, taken along lines 7—7 thereof, with the contacts thereof being aligned with contact receiving apertures in a mounting substrate.

Referring now to FIG. 7, there is shown the contact-insulator sub-assembly of FIG. 6 in assembled condition above a mounting substrate 60. The casing 32 and plug 52 are preferably retained in the assembled condition through frictional engagement between sliding mating surfaces of the two elements. The magnitude of the retaining force may be increased by providing mating dimples along the sides of the mating surfaces. As seen most clearly in FIGS. 5 and 6, a small dimple, or bump 61, may be provided along the side wall of the casing 32 which slidably engages a dimple or bump (not shown) in the side wall of the plug 52. In this manner sufficient retention forces can be generated to secure the two elements together, while allowing the casing 32 to be easily separated from the plug 52 when desired.

Referring still to FIG. 7, it can be seen that in the assembled contact-insulator configuration, the plug 52 matingly engages the casing 32 with the contacts 14 extending through the sleeves of each. The inside faces 36 and 54 of the casing 32 and plug 52, respectively, abuttingly engage across the top surfaces of said plug with the contact 14 securely held, generally motionless, therein and therebetween. In this assembled configuration the two part insulator 12 resembles and serves as a connector of unitary construction, akin to a discrete connector, with a common base mounting surface 62. Mounting surface 62 includes the lowermost surface of the ribs 58 of the plug 52 and inside surface 64 of the casing 32, and comprises that portion of the base of the insulative housing 12 adapted for generally flush engagement against the mounting substrate 60.

An insulator 12 of the present invention which is adapted for press fit mounting of contacts is preferably molded from a dielectric material having sufficient compressive strength to serve as a press fit seating tool for the contact 14. Insertion forces, in some instances as high as 50 to 60 pounds, are necessary to press fit a single contact in an aperture in a mounting substrate, therefore, sufficient load bearing surface area must be provided between the contact and insulator to maintain the force per unit area below the crush strength of the material. In the present design of the insulator 12, the broad shank region 22 of the contact 14 which comprises the upper portion 20, abuttingly engages the upper inside wall of the sleeve 16 providing ample, load bearing surface area for press fitting. Therefore, the insulator 12 of the present invention may utilize a conventional thermoplastic material of the type commonly used for other removable insulative housings which themselves are generally not adapted for serving as a seating tool for the contacts due to relatively low compressive strength.

Figure 8:
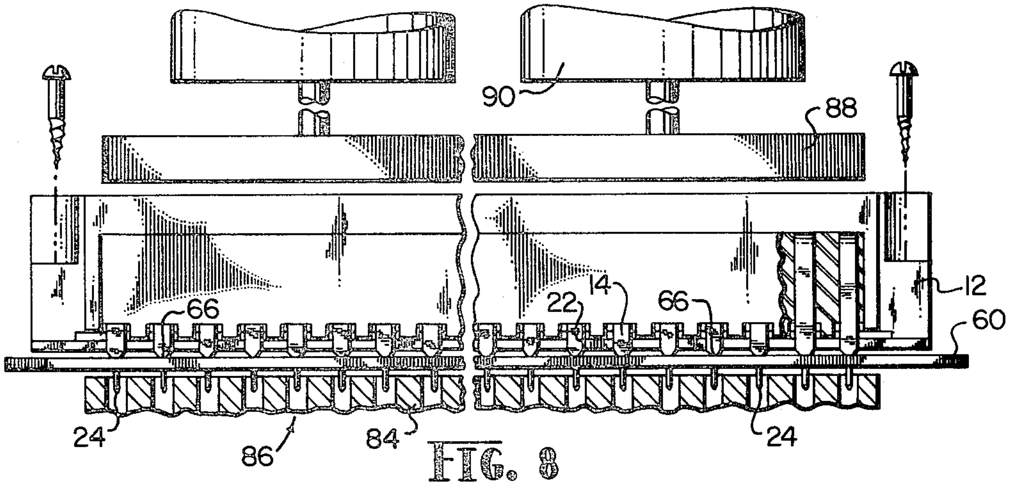
FIG. 8 is a fragmentary, front elevational view of the assembled connector sub-assembly of FIG. 6 during press fit assembly thereof to a mounting substrate.

The connector 10 of the present invention, as shown in FIGS. 1 and 7, includes the mounting substrate 60 which holds the contacts 14 tight and motionless therein. A mounting substrate 60, which is constructed in accordance with the principles of the present invention, includes a plurality of rows of preferably circular apertures 66 which may be plated through and spaced for alignment with the sleeves 16. The insulator and the contacts of the present invention are structurally attached to the mounting substrate 60 through the contacts secured therein by press fitting, wave soldering, or the like. Material such as glass-filled epoxy printed circuit board G-10, FR-4, or the like, has been shown to be satisfactory for such applications to comprise a connector assembly or an interconnection system. The insulator 12 may also be provided with apertured flanges 67 and 68, on opposite longitudinal ends of the casing 32 for additional structural attachment to the substrate 60. As seen in FIG. 8, suitable screws 70 may be provided for releasably affixing the casing 32 to the substrate and providing structural rigidity during coupling with a mating connector.

As seen most clearly in FIG. 1, the mating connector is preferably comprised of a complementary insulator configuration specifically adapted for mating engagement with the connector 10. Mating connector 11, as shown, may include an insulator 72, contacts 21 and mounting substrate 74 of the type disclosed and claimed in co-pending U.S. patent application, Ser. No. 597,751 above-described. The insulator 12 of the connector 10 of the present invention thus exhibits the skirt 40 in a size and shape for slidably receiving and engaging the upper body portion of the connector 11. A plurality of contact receiving sleeves 76 are similarly formed in the insulator 72 for abutting in registry the mating end of sleeves 16 of the connector 10. In this manner the contacts of each connector may be provided for mating engagement with one another to provide electrical interconnection between conductive elements (not shown) on the substrate 60 and conductive elements (also not shown) on the substrate 74.

Referring now to FIGS. 5 through 9, there is shown a method of assembling a connector 10 in accordance with the principles of the present invention. As shown most clearly in FIG. 5, it is preferable to mount the right angle contacts 14 into the casing 32 of the insulator 12 with a plurality of contacts joined together, either on a common support strip 30, or a bandolier (not shown) as may be necessary when the contacts are individually formed. For example, a bandolier may be necessary if the contacts 14 are produced from screw stock rather than from sheet metal. In this manner, simultaneous contact insertion is provided, overcoming many of the assembly problems of the prior art. The contacts 14, as shown, are each formed as part of the support strip 30, which is joined to the tail portion 24 of each contact by a narrow reduced section 78. The spacing, orientation and right angle configuration of the contacts 14 are provided at the time the contacts are stamped and formed, preferably in a progressive die. Blanked from sheet material, each formed contact 14 may be bent to the required angle configuration for insertion in a longitudinal row of sleeve passages 34; e.g., 90° from the plane of the strip for insertion while still attached to the strip.

After an elongate strip of contacts is formed on the support strip 30, the desired number of contacts is then selected and separated by cutting transversely through the support strip. The male portion 19 and remaining linear region 20 of the contacts 14 are inserted into the sleeve passages 34 from the inside face 36 of the casing 32 so that all the contacts on the strip are loaded simultaneously. The sleeve passages 34 are preferably somewhat larger than the contacts 14 so that they pass relatively freely through said sleeve portions to the outside face 38 of the casing 32. The tine region 19 of the upper contact region 20 passes through the sleeve passage 34, extending outwardly therefrom inside the cavity formed by the skirt 40, as shown most clearly in FIG. 6, until the orthogonal contact section 18 abuts the inside face 36. Once the contacts 14 are positioned within the sleeve passages 34, with the lower contact region 18 abutting against the inside face 36 and extending laterally outwardly therefrom, the support strip 30 may be flexed to sever it from the contacts through the narrow reduced sections 78. The support strip 30 may then be removed. Inside row 48 of contacts 14 is preferably installed prior to the outside row 44 since the orthogonal region 18 of the contacts of the outside row 44 lays over the contacts of the inside row 48.

The sub-assembly of the contacts 14 and the casing 32, as shown in FIG. 6, must be assembled to the plug 52 before the contacts are securely held in position. The sleeve passages 50 of the plug 52 receive the transversely extending portions 18 of the top row of contacts 14, as the plug 52 is mated and secured to the casing 32. As seen most clearly in FIG. 7, the inside row of contacts 14 may preferably not be positioned within sleeves but may be held between the casing 32 and plug 52 between inside walls 80 and 82 thereof, respectively. This sub-assembly configuration provides a stable assemblage of contacts held firmly within an insulator in condition for transportation and handling and/or assembly to a mounting substrate.

Figure 9:
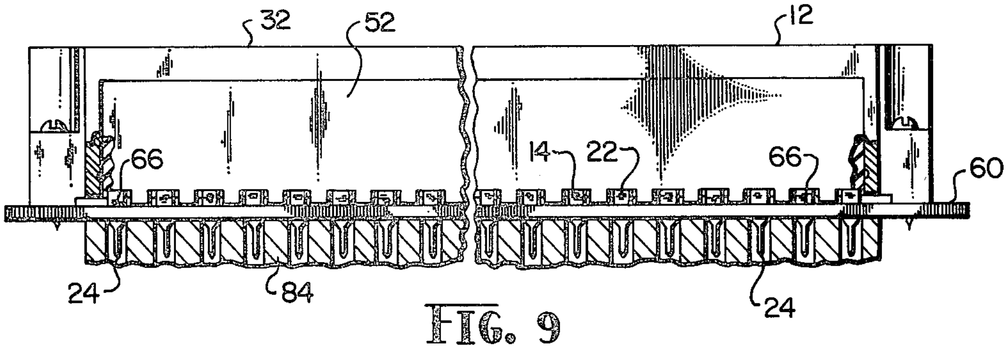
FIG. 9 is a fragmentary, front elevational view of the assembled connector of FIG. 8, illustrating the insulative housing affixed to the mounting substrate.

The assembly of the right angle contacts 14 into the mounting substrate 60 is greatly enhanced by the subassembly of the contact-insulator configuration above-described. This configuration allows multiple rows of right angle contacts to be inserted simultaneously into the mounting substrate, and press fitted when desirable which heretofore has been impractical. Referring now to FIGS. 8 and 9, the insulator 12, having multiple rows of contacts 14 adapted for press fit mounting and firmly supported and held in the sleeves 16 thereof, is positioned above the mounting substrate 60 with the tail portions 24 of each of the contacts 14 being guided into and received with clearance into the substrate apertures 66. The substrate may be placed upon a backup board 84 having clearance holes 86 therein and the insulator then placed beneath the ram 88 of a cylinder 90. In the event the contacts 14 are formed without the tail portions 24, which may be optional, the backup board 84 would not be necessary. When the cylinder 90 is operated to apply a downward force to the insulator 12 as shown in FIG. 9, the upper inside surfaces of the sleeve passages 34 bear against the upper, flat surfaces of the shank portion 22 of the contact region 20 to force the contacts 14 to move downwardly through the apertures 66 and press fit the shank portions 22 of the lower contact region 18 therein. The insulator 12 is thus seen to function as a holding fixture, a seating tool and a locating stop. In this manner, it precisely positions each one of the contact shank portions 22 the desired depth into the mounting substrate 60 when the insulator is mounted flush thereupon. As used herein, flush mounting is the term designating the abutting of a bottom portion of the insulator, e.g., mouting surface 62 discussed above, in its ultimate position against the mounting substrate.

Figure 10:
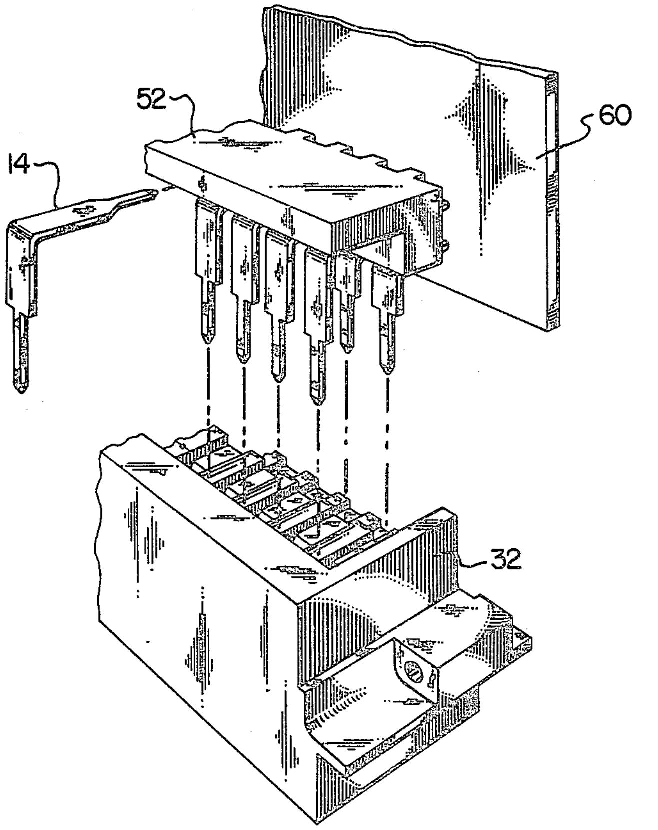
FIG. 10 is a fragmentary, exploded, perspective view of the connector of FIG. 9, illustrating the effective removal of the insulator from the connector by the removal of one section of the bipartite insulator shown for facilitating the removal of the contacts therein for repair.

In the embodiment of the assembled connector 10, as illustrated in FIGS. 1, 9 and 10, only a portion of the insulator 12, specifically the plug 52, is not removable from the contacts, which are secured in their mounting substrates fixedly through a solder joint or by a force on the order of 10 to 60 pounds per contact position when press fitted therein. The rigidity of the secured contact configuration permits the casing 32 of the insulator 12 to be removed from around the upper portion 20 of the contacts 14 by sliding it outwardly therefrom, as shown in FIG. 10. This provides access to and permits the removal of any number of contacts 14 from the mounting substrate 60 and the plug 52 held thereon by said remaining contacts. Similarly the casing 32 can be slidably reassembled to the contact-plug sub-assembly following repair operations.

In the connector of the present invention, the insulator acts not as the primary structural member, but as a holding fixture, seating tool and locating stop for simultaneously inserting all of the right angle contacts of the connector into the contact receiving apertures of the mounting substrate 60, which serves as the primary structural support for the contacts. The structure and method of the present invention enable a two-part insulator to be completely loaded with right angle contacts, transported to a remote assembly location, and there secured in apertures in a mounting substrate to form a structurally complete connector assembly. In the final connector assembly, the insulator serves as the conventional contact cover and mating guidance member. It may also be seen that similar configurations of the connector elements are within the scope of this invention.

Referring now to FIGS. 11 through 15, there are shown alternative embodiments of connector structures and assembly methods in accordance with the principles of the present invention. Each of these elements and assemblies incorporates the concept of an effectively removable insulator and right angle contacts which are respectively adapted for mounting in a mating sub-assembly to facilitate subsequent mounting on a substrate. Furthermore, each of these elements and methods incorporates the approach of a connector assembly having an insulator, which is effectively removable therefrom for replacement of the contacts housed therein.

Figure 11:
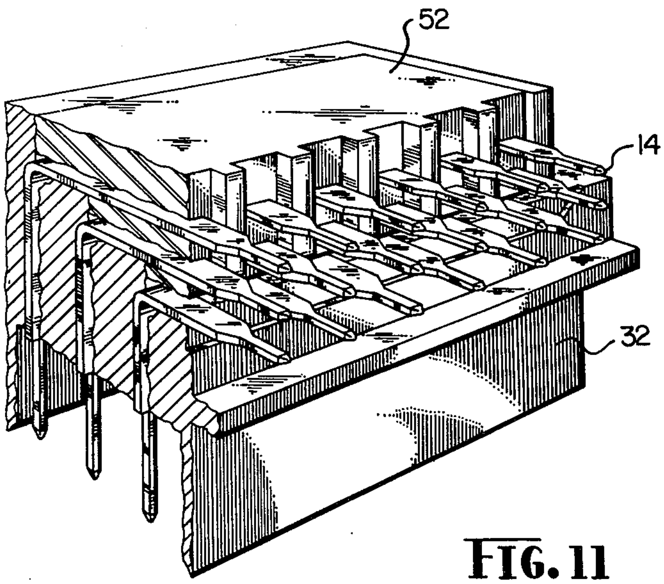
FIG. 11 is a fragmentary, perspective view of an alternative embodiment of a contact-insulator sub-assembly constructed in accordance with one embodiment of the present invention illustrating the structureal configuration of three longitudinal rows of contacts.
Figure 12:
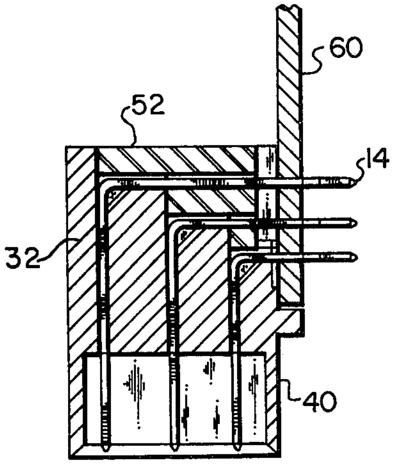
FIG. 12 is a side, elevational, cross-sectional view of the connector sub-assembly of FIG. 11 assembled to a mounting substrate.

As shown most clearly in FIG. 11, more than two longitudinal rows of contacts may be accommodated without deviating from the basic design concept, as the particular embodiment of the contact-insulator sub-assembly in FIGS. 1 and 12 as illustrated. Additional rows of contacts require additional longitudinal rows of sleeve passages 34 and 50 in the casing 32 and plug 52, respectively. It should be apparent that the contact-insulator sub-assembly of FIG. 11 may similarly serve as a holding fixture and seating tool for the contacts housed therein in generally equivalent applications to those above-described.

Figure 15:
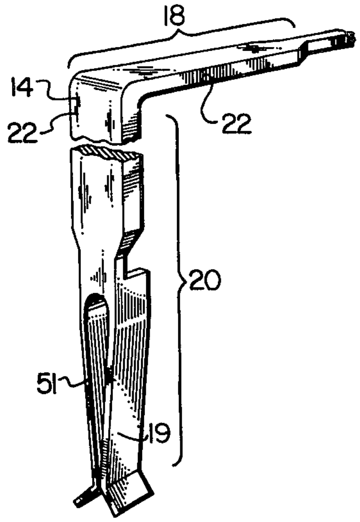
FIG. 15 is a perspective view of the female right angle constact of FIGS. 13 and 14, illustrating the construction thereof in accordance with one embodiment of the principles of the present invention.

Referring now to FIG. 15, there is shown an alternative embodiment of a right angle contact constructed in accordance with the principles of the present invention, wherein a contact 14 of a female variety is illustrated. In the example shown, the contact 14 includes a lower portion 18 and a shank portion 22 of an upper portion 20, in a generally equivalent configuration to that provided in the male contact of FIG. 4. The difference between the two contacts lies mainly in the mating end 19 which is herein comprised of a pair of outwardly extending tines 51, similar to those of the female contact 21 of the application above-discussed. It may be seen that the female contact 14 is otherwise shown to be constructed as set forth above for the male contact 14 and to be adaptable for either unitary or bipartite insulators.

Figure 13:
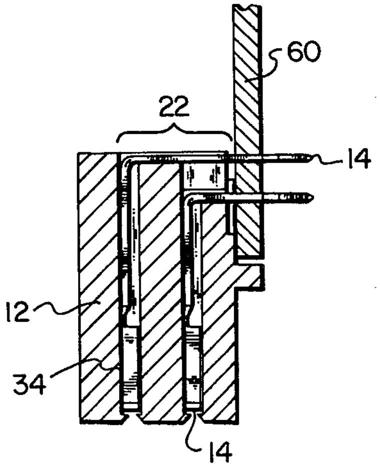
FIG. 13 is a side, elevational, cross-sectional view of an alternative embodiment of a connector constructed in accordance with one embodiment of the principles of the present invention and illustrating the structural configuration of a female type contact in a connector utilizing a single insulative housing section.
Figure 14:
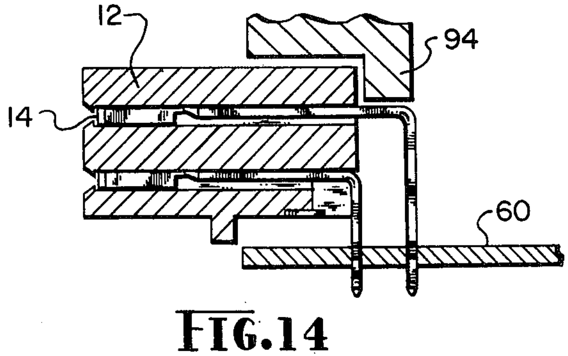
FIG. 14 is a side, elevational, cross-sectional view of an alternative embodiment of a contact-insulator sub-assembly constructed, and being assembled to a mounting substrate, in accordance with one embodiment of the principles of the present invention.

Referring now to FIGS. 13 and 14, there are shown two alternative embodiments of a contact-insulator sub-assembly constructed in accordance with the principles of the present invention, wherein a female contact is utilized and the insulator 12 is of a unitary construction, rather than bipartite. In the examples shown, the plug section 52 has been omitted as briefly above-discussed. The omission of this element necessitates certain structural changes in the casing 32, primarily in the area of the sleeve passages 34 and wholly within the spirit and scope of the present invention herein.

Referring now specifically to FIG. 13, it may be seen that the insulator 12 may be adapted for accommodating right angle contacts 14 without the plug 52. Moreover, the contacts 14 may be of either the male or female type. The latter female contact variety is shown in this figure for purposes of illustration. The sleeve passages 34 of FIG. 13 thus exhibit a wider cross-section to provide clearance for the female tines 51 during assembly. The sleeve passages 34 are also preferably constructed for light, interfering engagement with the contacts 14 of either the male or female type to retain said contacts therein prior to assembly with the mounting substrate 60. As used herein, the term light, interfering engagement refers to a retention force generally on the order of about 0.5 to 1.0 pounds each, great enough to hold the contacts in the insulator sleeve but small enough to prevent causing great resistance to the removal of the insulative housing from the contacts mounted in the substrate. In the female contact shown herein, the light, interfering engagement may be provided along the edges of the shank 22 of the upper contact region to provide a suitable retention force. The male contact may lightly interfere with the walls of sleeve 16 generally circumferentially about and above the shank 22 since it does not necessitate a passage 34 of an enlarged clearance size. It should also be noted that the relatively low retention force does not secure the contacts in the insulator as does the plug 52. Since the plug does securely hold the contacts 14 in alignment with the apertures 66 in the substrate 60, its absence necessitates additional care in assembly of the connector 10 in maintaining correct contact-aperture relationship during insertion of the contacts therein.

It may be observed that the contact-insulator assembly of FIGS. 13 and 14 is adapted for mounting to a planr substrate by press fitting, wave soldering, or the like, as set forth above for bipartite insulative housings. It may also be observed that the portion of the insulator 12 contiguous to and immediately above each contact 14 extends the full length thereof in FIG. 13 and not in FIG. 14 which appears to negate press fit applications. The insulator 12 of FIG. 13 is shown to be readily adaptable for press fitting the contacts 14 with a standard press fit tool while such a tool would leave the region nearest the lower shank 20 of the contacts unsupported in FIG. 14. However, when a specially constructed press fit tool of the type shown is utilized, press fit mounting is still feasible.

As shown in FIG. 14, an insulator 12 of unitary construction and recessed frontal edge may be constructed in accordance with the principles of the present invention and adapted for all forms of assembly, by providing for the application of a top loaded press fit force uniformly across both the exposed and nonexposed top surface of the right angle contacts through a lip 94 provided along the frontal edge of the press fit tool. The lip 94 replaces the recessed insulator portion for the top row of contacts 14. The inside contact is supported in the same manner as set forth above so as to accommodate press fitting forces. The sleeve passages 34 of insulator 12 of FIG. 14 are similarly constructed to lightly interfere with the contacts 14 held therein in order to retain said contacts prior to press fit mounting in the substrate 60.

It is to be understood that although the connector of the invention thus far illustrated has been shown to utilize one of two means of retaining the right angle contacts in the insulator comprising said connector, the use of other means is wholly within the scope of the present invention. In each case, however, the insulator serves as a holding fixture and seating tool for mounting the contacts in the mounting substrate while being effectively removable therefrom after assembly.

It is believed the operation and construction of the above decribed invention will therefore be apparent from the foregoing description. While the electrical connector and the method of assembly thereof shown and described has been characterized as being preferred, it will be obvious that various changes and modifications may be made therein without departing from the spirit and scope of the invention as defined in the following claims.

What is claimed is:

1. A method of assembling an electrical connector for orthogonal interconnection of planar substrates and which includes a removable insulative casing and an insulative plug interfittable therewith, said casing having a plurality of linear transverse sleeves formed therethrough and press fit contact terminals formed in a right angle configuration and adapted for positioning transverse portions thereof in the sleeves and orthogonal portions thereof in spaced alignment with contact receiving apertures formed in a planar substrate, said method comprising:

inserting the transverse portions of the contacts into the transverse portions of the sleeves in the insulative casing with the orthogonal contact portions depending therefrom in generally parallel spaced relationship;

inserting an insulative plug having spaced sleeves therein over the depending orthogonal contact portions to receive one of the orthogonal portions into each sleeve;

supporting the orthogonal contact portions along their edges to prevent twisting movement thereof during subsequent press fitting of the contacts;

supporting the entire length of both the inner and outer surfaces of the transverse contact portions within the sleeves in the insulative casing;

supporting a length of the inner surfaces of the orthogonal contact portions with surfaces of the insulative casing extending at right angles from the sleeves therein;

guiding the depending orthogonal contact portions into the aligned contact receiving apertures in the planar substrate; and applying a force to the side of the insulative casing opposite the depending orthogonal contact portions to transmit an axial force to said orthogonal contact portions to press fit said contacts into the contact receiving apertures in the substrate until the point that the face of said insulative plug abuts the upper surface of the substrate.

2. A method of assembling an electrical connector as set forth in claim 1 wherein the contacts are simultaneously inserted while extending transversely on a common support strip a spaced distance from one another and said inserting step includes:

severing the common support strip to separate a row of contacts on the strip from the rest;

simultaneously moving all of the contacts in the row into the sleeves in the insulator; and removing the common support strip to separate the inserted right angle contacts from one another.

3. A method of assembling an electrical connector as set forth in claim 2 wherein the common support strip comprises a transverse strip of metal extending along the bottoms of the contacts and joined thereto by a narrow reduced section.

4. A method of assembling an electrical connector as set forth in claim 1, wherein said step of inserting an insulative plug over the orthogonal contact portions includes the step of:

matingly engaging the insulative casing and the insulative plug with the right angle contacts housed therein.

* * * * *